United States Patent Office 3,219,633
Patented Nov. 23, 1965

3,219,633
LINEAR POLYURETHANE ELASTOMERS
Gabriel Xavier Roger Boussu, Chamalieres, and Louis Pierre Francois Andre Neuville and Jean-Marie Massoubre, Clermont-Ferrand, France, assignors to Michelin & Cie, Clermont-Ferrand (Puy-de-Dome), France, a French society
No Drawing. Filed July 10, 1962, Ser. No. 208,901
Claims priority, application France, June 26, 1959, 798,590
The portion of the term of the patent subsequent to August 13, 1980, has been disclaimed
14 Claims. (Cl. 260—75)

This application is a continuation-in-part of our copending application Serial No. 38,128, filed June 23, 1960, now U.S. Patent No. 3,100,759.

This invention relates to improved synthetic linear elastomers of the polyurethane type, and to an improved method for their preparation. In particular, this invention relates to linear polyurethane elastomers of the type used as substitutes for natural rubber products in the manufacture of tires, belts, pipes and molded laminated reinforced products.

Various methods of preparing branched chain elastomers of the polyurethane type have been proposed. One such method set forth in copending application Serial No. 19,997, filed April 5, 1960, comprised reacting together in a polymerizing reaction, a polymeric dihydroxy compound, a bifunctional compound reactive with diisocyanates, and an organic diisocyanate, the latter being used in molar excess, to result in a branched chain elastomer wherein free-NCO groups terminate all of the chains of the branched end products. The method also involved the steps of substituting hydroxyl groups for the free-NCO groups to block immediate cross linking, and subsequently vulcanizing the branched chain elastomer by adding a polyisocyanate and curing under pressure at an elevated temperature.

Another method proposed in French Patent No. 1,179,367 for preparing polyurethane elastomers involved heating a mixture of a polymeric dihydroxy compound, a molar excess of an organic diisocyanate and a monofunctional compound having only one group reactive with diisocyanate. The monofunctional compound was characterized by having non-benzoid unsaturation, e.g., geraniol and allyl amine. Such polyurethane elastomers, however, have poorer mechanical properties, particularly in regard to tensile strength and elasticity.

It has now been discovered, according to the objects of the present invention, that double terminal unsaturation can be introduced into a linear polyurethane elastomer molecule obtained by reacting together a saturated polymeric dihydroxy compound, such as polyethers, polyesters, polyester-ethers, or polyamides, and a diisocyanate, and subsequent vulcanization of the resulting stable di-terminally unsaturated linear polyurethane elastomer by a peroxide becomes possible resulting in improved mechanical properties, improved resistance to damage by heat, and the like.

Essentially, the double terminal unsaturation, and hence stability, is achieved by introducing into the linear polyurethane elastomer molecule a compound which is monofunctional with respect to diisocyanates, i.e., having a single terminal function reactive with respect to diisocyanate, namely a monohydric alcohol having two mono-ethylenically unsaturated radicals and the following general formula:

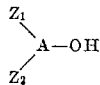

where A is a saturated trivalent radical, preferably aliphatic hydrocarbon, and may contain aromatic, ether, carboxyl, carbonyl, or other substituents inert with respect to diisocyanates; $Z_1$ is $$H-(CH_2)_{n_1}-CH=CH-(CH_2)_{n_2}-$$

$Z_2$ is $H-(CH_2)_{m_1}-CH=CH-(CH_2)_{m_2}-$; both $n_1$ and $m_1$ are the same or different whole numbers from 0 to 2; and both $n_1$ plus $n_2$ and $m_1$ plus $m_2$ are the same or different whole numbers from 0 to 8. It is preferred that $n_1$ and $m_1$ are each 0, and both $n_2$ and $m_2$ are the same or different whole numbers from 0 to 8. It is especially preferred that $n_1$ and $m_1$ are each 0, and both $n_2$ and $m_2$ are either 0 or 1, i.e., vinyl or allyl.

Examples of such suitable di-ethylenically unsaturated monohydric alcohols are diallyloxy propanol, allyl propenyl carbinol, allyl vinyl carbinol, and diallyl carbinol.

2,3-diallyloxy-1-propanol

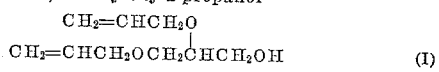 (I)

Allyl propenyl carbinol

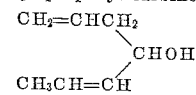

Allyl vinyl carbinol

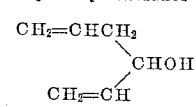

Diallyl carbinol

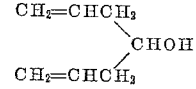

and/or the isomer 1,3-diallyloxy-2-propanol of Compound I

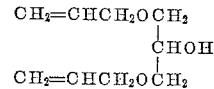

In the preparation of the stable di-terminally unsaturated linear polyurethane elastomer, the saturated polymeric dihydroxy compound, hereinafter designated by HO—P—OH, the organic diisocyanate, hereinafter designated OCN—D—NCO, and the di-ethylenically unsaturated monohydric alcohol which is monofunctional with respect to diisocyanates, described above, are simultaneously reacted together by heating a reaction mixture thereof.

A variant in the production of stable diterminally unsaturated linear polyurethane elastomers comprises introducing supplementary ethylenic unsaturations into the linear polyurethane by the additional simultaneous use in the reaction mixture of a mono- or di-ethylenically unsaturated dihydric alcohol which is bifunctional with respect to diisocyanates and has either of the following general formulae:

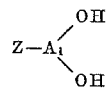

or

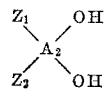

where $A_1$ and $A_2$ are trivalent and tetravalent saturated radicals respectively, preferably aliphatic hydro carbon, any may contain aromatic, ether, carboxyl, carbonyl, or other substituents inert with respect to diisocyanates; Z is $H-(CH_2)_{n3}-CH=CH-(CH_2)_{n4}-$; $Z_1$ is, as defined above, $H-(CH_2)_{n1}-CH=CH-(CH_2)_{n2}-$; $Z_2$ is, as defined above, $H-(CH_2)_{m1}-CH=CH-(CH_2)_{m2}-$; $n_3$, $n_1$ and $m_1$ are all the same or different whole numbers from 0 to 2; and $n_3$ plus $n_4$, $n_1$ plus $n_2$ and $m_1$ plus $m_2$ are all the same or different whole numbers from 0 to 8. It is preferred that $n_3$, $n_1$ and $m_1$ are each 0; and $n_4$, $n_2$ and $m_2$ are all the same or different whole numbers from 0 to 8. It is especially preferred that $n_3$, $n_1$ and $m_1$ are each 0; and $n_4$, $n_2$ and $m_2$ are all either 0 or 1, i.e., vinyl or allyl.

Examples of such suitable mono- or di-ethylenically unsaturated dihydric alcohols (unsaturated diols) are 2-allyloxy propane-1,3-diol; a mixture of allyloxy propanediols; 1,5-hexadiene-3,4-diol; 2,6-octadiene-4,5-diol; 1-butene-3-4-diol; or 2-pentene-4,5-diol.

2-allyloxy propane-1,3-diol

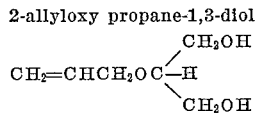

a mixture of allyloxy propanediols 1,5-hexadiene-3,4-diol     2,6-octadiene-4,5-diol

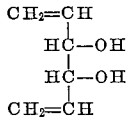     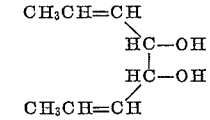

1-butene-3,4-diol

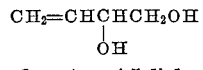

2-pentene-4,5-diol

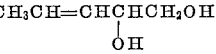

The purpose of the ethylenically unsaturated dihydric alcohol is to introduce supplementary unsaturations into the stable di-terminally unsaturated linear polyurethane elastomers to impart to vulcanizates thereof improved characteristics, principally a wide range of moduli of elasticity, while retaining a constant resistance against heat.

For the purpose of this invention, the saturated polymeric dihydroxy compound, HO—P—OH, shall be a polyester, a polyether, a polyester amide, or similar compound customarily used in the preparation of polyurethanes, having a molecular weight of from 750 to 10,000. The molecular weight should be, preferably, in the range of from 750 to 5,000, and, in the case of the polyester, preferably, between 1,200 and 3,500.

The organic diisocyanate, OCN—D—NCO, is preferably an aromatic diisocyanate, for example, 3,3'-dimethyl-4,4'-biphenylene diisocyanate; 4,4'-diphenylmethane diisocyanate; 2,4-toluene diisocyanate; 4,4'-diphenyl diisocyanate; paraphenylene diisocynate; or a mixture of these.

In the preparation of the stable di-terminally unsaturated linear polyurethane elastomers the saturated polymeric dihydroxy compound, HO—P—OH and the diethylenically unsaturated monohydric alcohol.

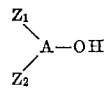

react with a quantity of the organic diisocyanate, OCN—D—NCO, which is functionally equivalent to the hydroxyl groups of the two preceding compounds, i.e., as much —NCO as —OH, in accordance with following equation:

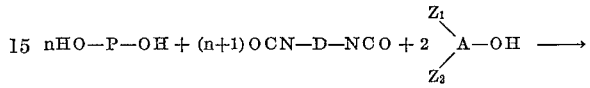

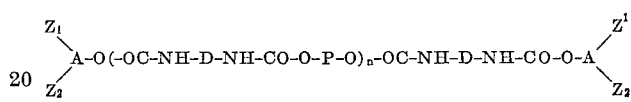

In the above equation, $n$ (number of moles) is selected according to the molecular weight and, consequently, to the plasticity desired in the elastomer. Therefore, $n$ can vary between very large limits. Preferably, $n$ is chosen so as to obtain an elastomer having a molecular weight ranging from 80,000 to 120,000.

In the variant of the process of the invention where supplementary ethylenic unsaturations are introduced into the linear polyurethane, the reaction mixture also contains the above mentioned mono- or di-ethylenically unsaturated dihydric alcohol in any desired amount, such as $m$ moles, and an additional amount equal thereto, i.e., $m$ moles, of the organic diisocyanate. The reaction is in accordance with the following equation wherein the dihydric alcohol has been represented for convenience by HO—B—OH:

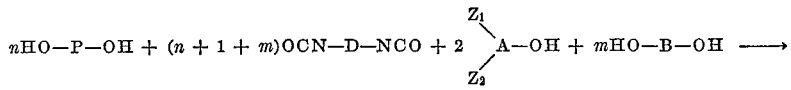

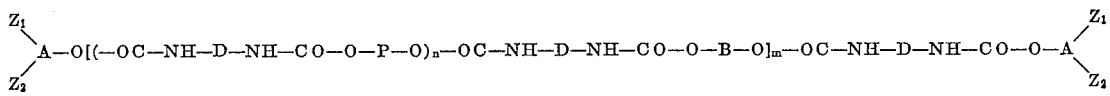

In this equation, $m$ and $n$ determine the molecular weight of the elastomer.

It must be remembered that a polyester used in connection with the present invention generally has a water content of from .01% to .15%. Thus, any evaporation of the water must be taken into account in calculating the above amounts of the various reactants. This procedure is well known by those skilled in the art.

To obtain the final desired product or vulcanizate, a conventional amount of an organic peroxide, or other peroxides well known to those skilled in the art, is added to the stable di-terminally unsaturated linear polyurethane elastomer. An example of a suitable peroxide is dicumyl peroxide, marketed under the trade name Di-Cup, manufactured by the Hercules Powder Company. After addition of the peroxide, the linear elastomer is cured under pressure, preferably in excess of 10 kg./cm.$^2$, at temperatures between 140° C. and 160° C., to produce a vulcanized product of satisfactory characteristics.

The resistance against rupture, and other characteristics of the vulcanized products, may be improved by the use of fillers, for example carbon black. The addition of carban black increases the resistance of the vulcanized elastomer to abrasion.

The linear polyurethane vulcanizates have a higher resistance to deterioration by heat than do branched chain polyurethane vulcanizates. This can be shown by testing the extent of relaxation of tension of the vulcanized elastomer at a constant elongation, and at temperatures close to 150° C. It was noted that the resistance to relaxation of tension increased as the degree of branching of the elastomer was decreased. This is attributable mainly to the absence of the allophanate or biuret groups, the apparent cause of deterioration of the urethane rubbers vulcanized by diisocyanates at temperatures higher than 150° C.

The resilience and the resistance to heating of the rubbers obtained according to the present invention, when submitted to repeated bendings, are excellent, but depend as do conventional elastomers on the rate of load.

The following examples are illustrative of the invention. It should be noted that the formulations stated in the examples were all arrived at as a result of a multiple number of experiments in which the amounts of the reactants were varied about theoretically calculated values.

In the examples, it is to be understood that all reference to parts of reactants used will be deemed to mean parts by weight.

*Example 1*

To 1,000 parts of a mixed ethylene and propylene polyadipate (ethylene glycol: 3; propylene glycol: 1) with a hydroxyl number of 69.3 and an acid number of 2.1 and having a water content of between 0.3% and 0.06%, there was added 11.6 parts of diallyloxy propanol. To this mixture, there was added, under agitation and at 70° C., 176 parts of 4,4'-diphenylmethane diisocyanate. After 10 minutes of agitation the thick liquid was transferred to a tank and heated at 120° C. during 10 hours.

*Example 2*

To 1,000 parts of the polyester of Example 1, which had been dehydrated for 30 minutes, at 130° C. under a 20 mm. mercury vacuum, 0.3 part of ferric chloride (a catalyst), 10.3 parts of diallyloxy propanol and 3.9 parts of allyloxy propanediol were mixed and completely homogenized at 70° C.

Thereafter, 176 parts of 4,4'-diphenylmethane diisocyanate were added and the mixture was continuously agitated for 10 minutes. After that, the viscous mass was transferred to a tank and heated at 120° C. for 5 hours, producing a urethane rubber (II) which has a plasticity which is compatible with its being worked in roll mixtures at 50° C.–60° C. (Mooney viscosity at 100° C. is 21.)

*Example 3*

1,000 parts of the polyester prepared in accordance with Example 2, 0.3 part of ferric chloride (a catalyst), 10 parts of magnesia (a catalyst), 3.9 parts of allyloxy propanediol and 10.3 parts of diallyloxy propanol were mixed and homogenized at 90° C.

187 parts of 3,3'-dimethyl-4,4'-biphenylene diisocyanate were added to the preceding mixture. After agitation for 30 minutes the viscous liquid was transferred to a tank and subjected to heating at 120° C. for 12 hours, producing an elastomer (III) which in its appearance and plasticity was comparable to that of Example 2.

*Example 4*

To 1,000 parts of a mixed ethylene and propylene polyadipate (ethylene glycol: 3; propylene glycol: 1) with a hydroxyl number of 41.9 and an acid number of 1.2, dehydrated for 30 minutes at 130° C. under a 20 mm. mercury vacuum, there was added 0.3 part of ferric chloride and 8.5 parts of diallyloxy propanol.

After good homogenization there was incorporated at 70° C., 105 parts of 4,4'-diphenylmethane diisocyanate. Agitation was effected for 10 minutes after which the viscous liquid which was obtained was transferred to a tank and heated at 120° C. for 5 hours, producing an elastomer (IV) whose appearance was identical to that of the preceding elastomers.

*Example 5*

This example is identical with Example 4, but for the purpose of comparison, the diallyloxy propanol was substituted by 7.5 parts of geraniol, namely $$(CH_3)_2C=CHCH_2CH_2C(CH_3)=CHCH_2OH$$

The vulcanized product had very mediocre characteristics (note hysteresis loss and rupture, in the general table below), and illustrates the preparation of a product by the use of a di-ethylenically unsaturated monohydric alcohol which does not fall within the definition stated in accordance with the invention.

*Example 6*

To 1,000 parts of a mixed ethylene and propylene polyadipate (ethylene glycol: 3; propylene glycol: 1) with a hydroxyl number of 34.6 and an acid number of 0.2, dehydrated for 30 minutes at 130° C. under a 20 mm. mercury vacuum, there was added 0.3 part of ferric chloride and 6.9 parts of diallyloxy propanol.

After good homogenization, 80.5 parts of 4,4'-diphenylmethane diisocyanate was incorporated at 70° C. The mixture was agitated for 10 minutes and the viscous liquid obtained was transferred to a tank and heated at 120° C. for 5 hours, producing an elastomer (VI), which had a plasticity permitting its being worked in a roll mixer at 60° C.

*Example 7*

To 1,000 parts of a mixed ethylene and propylene polyadipate identical with the one of the preceding example, dehydrated for 30 minutes at 130° C. under a 20 mm. mercury vacuum, 0.3 part of ferric chloride and 3.85 parts of allyl vinyl carbinol were added. After homogenization, 82.5 parts of 4,4'-diphenylmethane diisocyanate were added at 70° C. The mixture was agitated for 10 minutes and transferred to a tank and heated at 120° C. for 5 hours. An elastomer (VII) was thus obtained.

*Example 8*

To 1,000 parts of mixed ethylene and propylene polyadipate as used in the preceding tests there was added under the same conditions and in accordance with the same manner of operation 0.3 part of ferric chloride, 4.4 parts of diallyl carbinal and 81.5 parts of 4,4'-diphenylmethane diisocyanate. After heating there was obtained an elastomer (VIII) which as regards its plasticity and its performance in the roll mixer, was identical with the preceding elastomers.

*Example 9*

To 1000 parts of a polyester identical with the one in Examples 6, 7 and 8, there were added 0.3 parts of ferric chloride and 2.26 parts of allyl amine $$(CH_2=CHCH_2NH_2)$$

and homogenization was effected at 40° C. After 81.5 parts of 4,4'-diphenylmethane diisocyanate had been incorporated under agitation, the temperature rose by itself. At the end of 10 minutes, the viscous mixture was transferred to a tank and heated at 120° C. during 5 hours, producing an elastomer (IX).

This example, similar to Example 5 using geraniol, is designed to illustrate by comparison the mediocre properties of products produced using a monofunctional monoethylenically unsaturated component (amine) not covered by the definition in accordance with the invention.

Improved resistance to thermal deterioration of the vulcanized products is demonstrated by comparison of the "time of relaxation" of tension, at constant elongation, of the various vulcanized rubbers, especially the polyurethane rubbers vulcanized with either diisocyanates or peroxides.

"Time of relaxation" for the purposes of this application, shall be defined as the time (expressed in minutes) at the end of which the tension reaches one half of its initial value.

The rubber test piece of a width of 1 mm. is submitted to elongation of 50% and heated by air.

The following table gives the time of relaxation at 140° C. and 160° C., in that order. The rubbers vulcanized with peroxides have been separated into two groups differing by the degree of branching $r$ of the original elastomer. (In the linear polyurethane elastomer, there are two terminal groups, whereas in the branched chain polyurethane elastomer there may be $x$ number of terminal groups. In this latter instance, the degree of branching ($r$) shall be defined as equal to the number of terminal groups of the branched chain molecule ($x$) minus the number of terminal groups in the linear molecule, which latter number equals 2. In other words, the degree of branching shall be represented by the formula $r=x-2$. In the linear elastomer, therefore, $r=0$.) It will be observed that a particularly high time of relaxation is obtained with lower degree of branching, and reaches 200 minutes at 160° C. for $r=0$.

| Vulcanized Rubbers | Times of relaxation (min.) | |
|---|---|---|
| | At 140° C. | At 160° C. |
| Natural Rubber | 23 | 4 |
| Styrene Butadiene Rubber (GRS) | 35 | 10 |
| Vulcanized polyurethanes: | | |
| With diisocyanates | 18 | 3 |
| With peroxides ($2<r<4$) | 30 to 50 | 9 to 20 |
| With peroxides ($0<r<1$) | >100 | 30 to 200 |

These results represent the medians of a large number of measurements of various rubbers the conditions of vulcanization of which were varied. Obviously, these were rubbers charged with carbon black, except for the polyurethanes vulcanized with diisocyanates.

In the following table the characteristics of the vulcanizates of the products prepared in accordance with 1 to 9 above have been summarized.

We claim:
1. The process for the preparation of a stable di-terminally unsaturated linear polyurethane elastomer which comprises the steps of (1) mixing and heating at a temperature from about 70° C. to about 90° C. for from about 10 to about 30 minutes
   (a) $n$ moles of a saturated polymeric dihydroxy compound having a molecular weight of 750 to 10,000 selected from the group consisting of polyesters, polyethers, polyamides, polyester-ethers and polyester-amides having as sole reactive groups two terminal hydroxy groups,
   (b) $n+1$ moles of an organic diisocyanate whose sole reactive groups are two isocyanate groups, and
   (c) 2 moles of a di-ethylenically unsaturated monohydric alcohol which is monofunctional with respect to isocyanates; having the formula

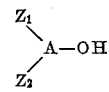

where A is a saturated aliphatic trivalent radical,
$Z_1$ is $H-(CH_2)_{n_1}-CH=CH-(CH_2)_{n_2}-$,
$Z_2$ is $H-(CH_2)_{m_1}-CH=CH-(CH_2)_{m_2}-$,
both $n_1$ and $m_1$ are whole numbers from 0 to 2, and both $n_1$ plus $n_2$ and $m_1$ plus $m_2$ are whole numbers from 0 to 8 thereby forming a homogenized liquid mixture of (a), (b) and (c), and (2) further heating said homogenized liquid mixture at a temperature of about 120° C. for from about 5 to about 12 hours thereby forming a stable di-terminally unsaturated linear polyurethane elastomer.

2. The process in accordance with claim 1 wherein $n_1$ and $m_1$ are each 0, and both $n_2$ and $m_2$ are whole numbers from 0 to 8.

3. The process in accordance with claim 1 wherein $n_1$ and $m_1$ are each 0, and both $n_2$ and $m_2$ are whole numbers from 0 to 1.

4. The process in accordance with claim 3 wherein the di-ethylenically unsaturated monohydric alcohol which is monofunctional with respect to isocyanates is selected from the group consisting of diallyloxy propanol, allyl vinyl carbinol and diallyl carbinol.

5. The process in accordance with claim 1 wherein the homogenized liquid mixture also contains
   (d) an ethylenically unsaturated dihydric alcohol

GENERAL TABLE OF CHARACTERISTICS OF VULCANIZATES

| Example or vulcanizate | Philblack I (carbon black) | Di-Cup 40 (dicumyl peroxide) | Modulus of elasticity (at 150% in g./mm.²) | Hysteresis loss at 20° C. | Rupture in kg./mm.² | Elongation in Percent |
|---|---|---|---|---|---|---|
| 1 | 20 | 8 | 229 | 17.5 | 4.1 | 570 |
|   | 30 | 8 | 250 | 29 | 3.8 | 440 |
| 2 | 20 | 6 | 176 | 17.4 | 3.52 | 460 |
|   | 30 | 6 | 214 | 30.5 | 3.72 | 405 |
| 3 | 20 | 6 | 250 | 19.3 | 3.22 | 360 |
|   | 30 | 6 | 290 | 24.5 | 3.24 | 287 |
| 4 | 20 | 6 | 178 | 12 | 4.1 | 425 |
|   | 30 | 6 | 208 | 15.6 | 3.5 | 395 |
| 5* | 20 | 6 | 94 | 23.8 | 2.2 | 600 |
|   | 30 | 6 | 118 | 35.7 | 2.6 | 365 |
| 6 | 20 | 6 | 147.3 | 14.76 | 3.68 | 445 |
|   | 30 | 6 | 193.6 | 21.8 | 4.07 | 510 |
| 7 | 20 | 6 | 157.3 | 17.78 | 3.34 | 420 |
|   | 30 | 6 | 195.6 | 25.23 | 3.51 | 465 |
| 8 | 20 | 6 | 129 | 16.13 | 3.64 | 475 |
|   | 30 | 6 | 182 | 25.8 | 3.9 | 500 |
| 9* | 20 | 6 | 126 | 30.33 | 1.47 | 430 |
|   | 30 | 6 | 187 | 40.6 | 2.63 | 475 |

*In these Examples 5 and 9, the unsaturated monofunctional compounds used did not fall within that defined according to the concepts of the invention.

which is bifunctional with respect to isocyanates having a formula selected from the group consisting of

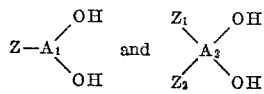

where $A_1$ and $A_2$ are saturated aliphatic trivalent and tetravalent radicals respectively,
Z is $H-(CH_2)_{n_3}-CH=CH-(CH_2)_{n_4}-$,
$Z_1$ is $H-(CH_2)_{n_1}-CH=CH-(CH_2)_{n_2}-$,
$Z_2$ is $H-(CH_2)_{m_1}-CH=CH-(CH_2)_{m_2}-$,
$n_3$, $n_1$ and $m_1$ are all whole numbers from 0 to 2, and $n_3$ plus $n_4$, $n_1$ plus $n_2$ and $m_1$ plus $m_2$ are all whole numbers from 0 to 8, and
(e) an additional molar amount of the organic diisocyanate equal to the molar amount of the ethylenically unsaturated dihydric alcohol;
whereby supplementary ethylenic unsaturations are introduced into the stable di-terminally unsaturated linear polyurethane elastomer.

6. The process in accordance with claim 5 wherein the ethylenically unsaturated dihydric alcohol which is bifunctional with respect to isocyanates is selected from the group consisting of allyloxy propanediol, 1,5-hexadiene-3,4-diol, 2,6-octadiene-4,5-diol, 1-butene-3,4-diol and 2-pentene-4,5-diol.

7. The process in accordance with claim 1 which comprises the further step (3) of heating the stable di-terminally unsaturated linear polyurethane elastomer with an organic peroxide at a temperature of from about 140° C. to about 160° C. and at a pressure of at least about 10 kilograms per square centimeter to form a vulcanizate.

8. The process in accordance with claim 7 wherein the organic peroxide is dicumyl peroxide.

9. The process in accordance with claim 5 which comprises the further step (3) of heating the stable di-terminally unsaturated linear polyurethane elastomer containing supplementary ethylenic unsaturations with an organic peroxide at a temperature of from about 140° C. to about 160° C. and at a pressure of at least about 10 kilograms per square centimeter to form a vulcanizate.

10. The process in accordance with claim 9 wherein the organic peroxide is dicumyl peroxide.

11. The stable di-terminally unsaturated linear polyurethane elastomer produced by the process of claim 1.

12. The stable di-terminally unsaturated linear polyurethane, elastomer containing supplementary ethylenic unsaturations produced by the process of claim 5.

13. The polyurethane vulcanizate produced by the process of claim 7.

14. The polyurethane vulcanizate produced by the process of claim 9.

References Cited by the Examiner

UNITED STATES PATENTS

| | | | |
|---|---|---|---|
| 2,621,166 | 12/1952 | Schmidt et al. | 260—75 |
| 2,806,835 | 9/1957 | Nischk et al. | 260—75 |
| 2,820,020 | 1/1958 | Franko-Filipasic | 260—75 |
| 2,915,493 | 12/1959 | Nischk et al. | 260—75 |
| 3,100,759 | 8/1963 | Boussu et al. | 260—77.5 |

FOREIGN PATENTS

| | | |
|---|---|---|
| 820,004 | 9/1959 | Great Britain. |
| 820,005 | 9/1959 | Great Britain. |
| 822,532 | 10/1959 | Great Britain. |
| 895,648 | 11/1953 | Germany. |

OTHER REFERENCES

Bayer et al., Rubber Chem. and Tech., 23, 812–835 (1950).

DONALD E. CZAJA, *Primary Examiner.*

JOSEPH R. LIBERMAN, LEON J. BERCOVITZ,
*Examiners.*